(12) United States Patent
Yaniak et al.

(10) Patent No.: US 9,522,425 B2
(45) Date of Patent: *Dec. 20, 2016

(54) METHOD OF CASTING

(71) Applicant: Caterpillar Inc., Peoria, IL (US)

(72) Inventors: Thomas John Yaniak, Washintgon, IL (US); Thomas Majewski, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,291

(22) Filed: Oct. 20, 2015

(65) Prior Publication Data

US 2016/0039001 A1 Feb. 11, 2016

Related U.S. Application Data

(63) Continuation of application No. 14/243,471, filed on Apr. 2, 2014, now Pat. No. 9,192,987.

(60) Provisional application No. 61/809,029, filed on Apr. 5, 2013.

(51) Int. Cl.
| | |
|---|---|
| *B22D 19/00* | (2006.01) |
| *B22D 13/00* | (2006.01) |
| *B22D 19/16* | (2006.01) |
| *B22D 19/04* | (2006.01) |
| *B22D 13/04* | (2006.01) |
| *B60B 15/02* | (2006.01) |

(52) U.S. Cl.
CPC ............. *B22D 19/16* (2013.01); *B22D 13/04* (2013.01); *B22D 19/00* (2013.01); *B22D 19/04* (2013.01); *B60B 15/025* (2013.01); *B60B 2310/202* (2013.01); *B60B 2360/102* (2013.01)

(58) Field of Classification Search
CPC ......... B22D 19/00; B22D 13/00; E02D 3/026; B60B 15/02; B60B 15/025
USPC .................... 164/91–112, 114–118
See application file for complete search history.

(56) References Cited

U.S. PATENT DOCUMENTS

| | | | |
|---|---|---|---|
| 2,710,997 A | 6/1955 | Krepps | |
| 3,414,044 A | 12/1968 | Justus et al. | |
| 4,211,269 A | 7/1980 | Bentz et al. | |
| 4,608,318 A | 8/1986 | Makrides et al. | |
| 4,667,543 A | 5/1987 | Tsugaki et al. | |
| 5,558,150 A | 9/1996 | Sponseller | |
| 5,743,033 A | 4/1998 | Gegel | |
| 6,632,045 B1 | 10/2003 | McCartney | |
| 8,197,157 B2 | 6/2012 | Brockway | |
| 9,192,987 B2 * | 11/2015 | Yaniak | B22D 19/00 |
| 2009/0045669 A1 * | 2/2009 | McPhail | B23K 9/232 301/43 |

(Continued)

FOREIGN PATENT DOCUMENTS

| | | |
|---|---|---|
| EP | 0138155 | 4/1985 |
| JP | H07108371 | 4/1995 |

(Continued)

*Primary Examiner* — Kevin E Yoon
(74) *Attorney, Agent, or Firm* — Finnegan, Henderson, Farabow, Garrett & Dunner, LLP; Bart A. Fisher (57) ABSTRACT

A method of casting an article includes positioning a first portion of the article, formed from a first material, in a rotatable mold. Additionally, the method includes, while rotating the mold, pouring a molten second material into the mold over the first portion to form a second portion of the article that is metallurgically bonded to the first portion of the article.

10 Claims, 12 Drawing Sheets

(56) References Cited

U.S. PATENT DOCUMENTS

| | | |
|---|---|---|
| 2010/0275473 A1 | 11/2010 | Maher |
| 2012/0003042 A1 | 1/2012 | McPhail et al. |
| 2012/0131820 A1 | 5/2012 | Brufau Guinovart et al. |
| 2012/0213586 A1 | 8/2012 | Ugru |
| 2013/0075456 A1* | 3/2013 | Hinrichsen ............ E02D 3/026 228/262.42 |
| 2013/0146366 A1 | 6/2013 | Cheng et al. |

FOREIGN PATENT DOCUMENTS

| | | |
|---|---|---|
| JP | 02-781717 | 7/1998 |
| JP | 2010-075978 | 4/2010 |
| KR | 101175410 | 8/2012 |
| WO | WO 2011/110137 A1 | 9/2011 |

* cited by examiner

METHOD OF CASTING

CROSS-REFERENCE TO RELATED APPLICATION

This is a continuation application of application Ser. No. 14/243,471, filed Apr. 2, 2014, which is a non-provisional application claiming the benefit of U.S. Provisional Patent Application No. 61/809,029, filed Apr. 5, 2013, both of which are hereby incorporated by reference in their entirety.

TECHNICAL FIELD

The present disclosure relates generally to a method of casting and, more particularly, to a method of casting articles, such as wear components for compactor wheels.

BACKGROUND

Compactors such as, for example, landfill compactors and soil compactors typically include steel wheels, which are fitted with teeth that extend radially outward from the wheels to engage and compact material over which the compactors are driven. Over time, the teeth wear down, and they are replaced with newly manufactured teeth.

U.S. Pat. No. 6,632,045 to McCartney ("the '045 patent") discloses an exemplary method of manufacturing a two-part tooth that is adapted to be welded to a steel wheel. The tooth includes a base constructed from a weldable material, and a cap constructed of a harder metal than the metal used for the base. According to the '045 patent, the tooth is manufactured by casting the base in a first mold, moving the base to a second mold, and casting the cap onto the base in the second mold. When casting the cap, molten metal flows into mating formations of the base, ensuring that the cap is firmly keyed to the base when the molten metal solidifies.

While the manufacturing method of the '045 patent may yield a tooth that is appropriate for certain applications, the tooth may not be well-suited for others. For example, the manufacturing method of the '045 patent may yield a tooth that is not well-suited for applications in which the tooth's weight stresses drivetrain components of a compactor without meaningfully improving compaction. In such applications, the tooth might cause premature failure of the drivetrain components, thereby unnecessarily increasing maintenance costs associated with the compactor.

The various embodiments of the present disclosure are directed toward overcoming one or more deficiencies of the prior art.

SUMMARY

In an exemplary embodiment of the present disclosure, a method of casting an article includes positioning a first portion of the article, formed from a first material, in a rotatable mold. Additionally, the method includes, while rotating the mold, pouring a molten second material into the mold over the first portion to form a second portion of the article that is metallurgically bonded to the first portion of the article.

In another exemplary embodiment of the present disclosure, a method of casting an article includes rotating a mold about an axis while performing several steps. The steps include pouring a molten first material into the mold to form a first portion of the article having a solid cross-section that is perpendicular to the axis. In addition, the steps include allowing the first material to cool. The steps also include pouring a molten second material into the mold over the first portion to form a second portion of the article that is metallurgically bonded to the first portion of the article.

In yet another exemplary embodiment of the present disclosure, a method of casting an article includes rotating a mold about an axis while performing several steps. The steps include pouring a molten first material into the mold to form a first portion of the article having a cross-section that is perpendicular to the axis with a non-circular outer edge. In addition, the steps include allowing the first material to cool. The steps also include pouring a molten second material into the mold over the first portion to form a second portion of the article that is metallurgically bonded to the first portion of the article.

DETAILED DESCRIPTION

Figure 1:
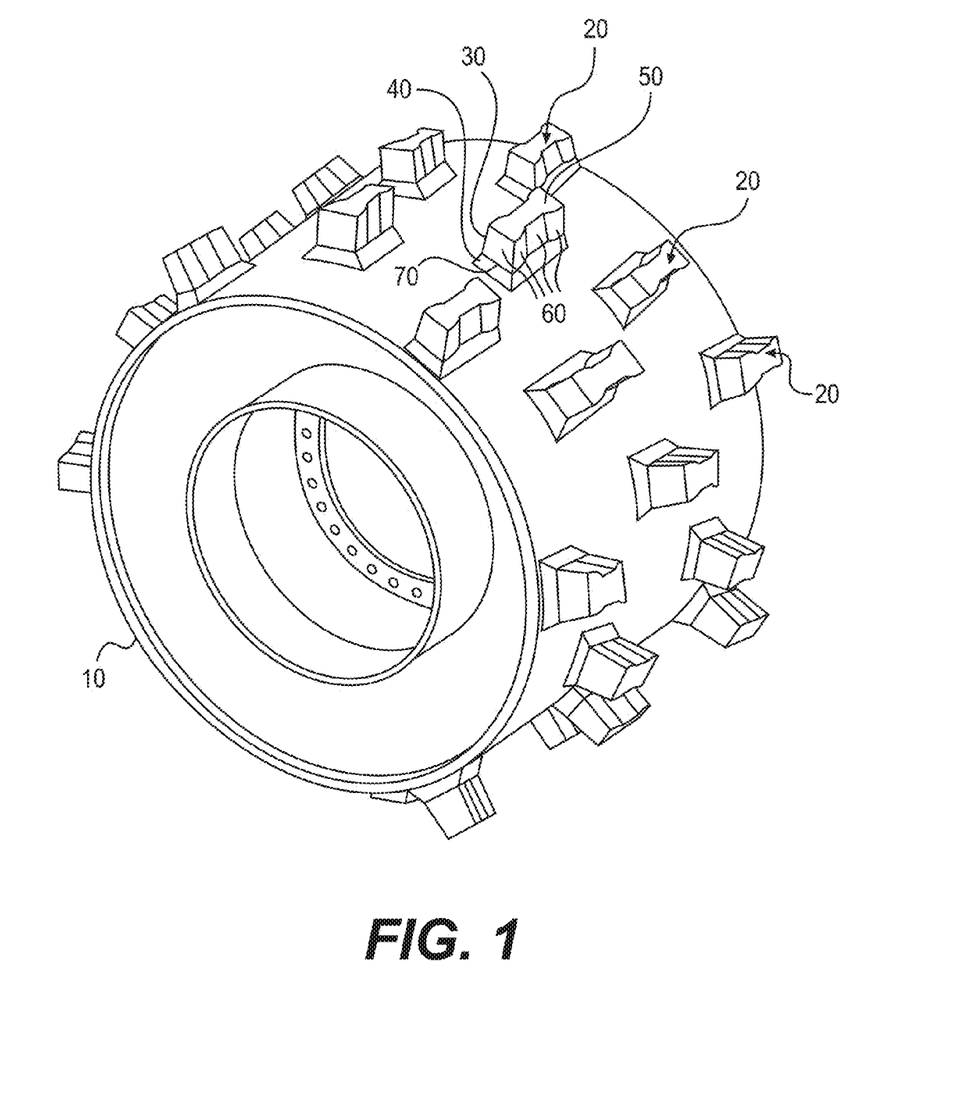
FIG. 1 is a pictorial illustration of an exemplary wheel for use with a compactor.

FIG. 1 illustrates a steel wheel 10 for use with a mobile machine, such as a landfill or soil compactor. As shown, wear components 20 in the form of teeth are fitted to wheel 10, and extend radially outward from wheel 10 to engage and compact material over which wheel 10 is driven. It should be understood, however, that wear components 20 may be teeth that are fitted to another type of part (e.g., a bucket) or may be another type of wear component entirely (e.g., hammers on disk rotors of a scrap metal shredder). In any case, in certain embodiments (e.g., the embodiment of FIG. 1), each wear component 20 may include a tip portion 30 that extends radially outward from wheel 10 to engage and compact material over which steel wheel 10 is driven. In these embodiments, tip portion 30 may be connected to wheel 10 by a base portion 40 of its wear component 20, which may be welded to wheel 10.

Tip portion 30 may have a distal end 50 defining an exterior surface of its wear component 20. As shown in FIG. 1, distal end 50 may be generally I-shaped. It should be understood, however, that distal end 50 may be otherwise shaped. For example, distal end 50 may be generally +(plus)-shaped. Alternatively, distal end 50 may have another shape conducive to compacting material. Tip portion 30 may also include side surfaces 60 extending from distal end 50 to a proximate end 70 of tip portion 30. In certain embodiments, side surfaces 60 may be at least partially concave, enabling them to deflect material away from base portion 40 and thereby protect base portion 40 from wear. Alternatively, side surfaces 60 may have other shapes that are conducive to compacting material (e.g., shapes that are not at least partially concave). Regardless of tip portion 30's shape, tip portion 30 may be formed from a material with a hardness of at least 45 Rockwell C, making it highly resistant to abrasion resulting from compaction of material. For example, tip portion 30 may be formed from white iron (e.g., high-chromium white iron or Ni-Hard), carbidic iron, austempered iron, high-carbon steel, high-carbon alloy steel, tool steel, carbidic steel, or stainless steel.

Figure 2:
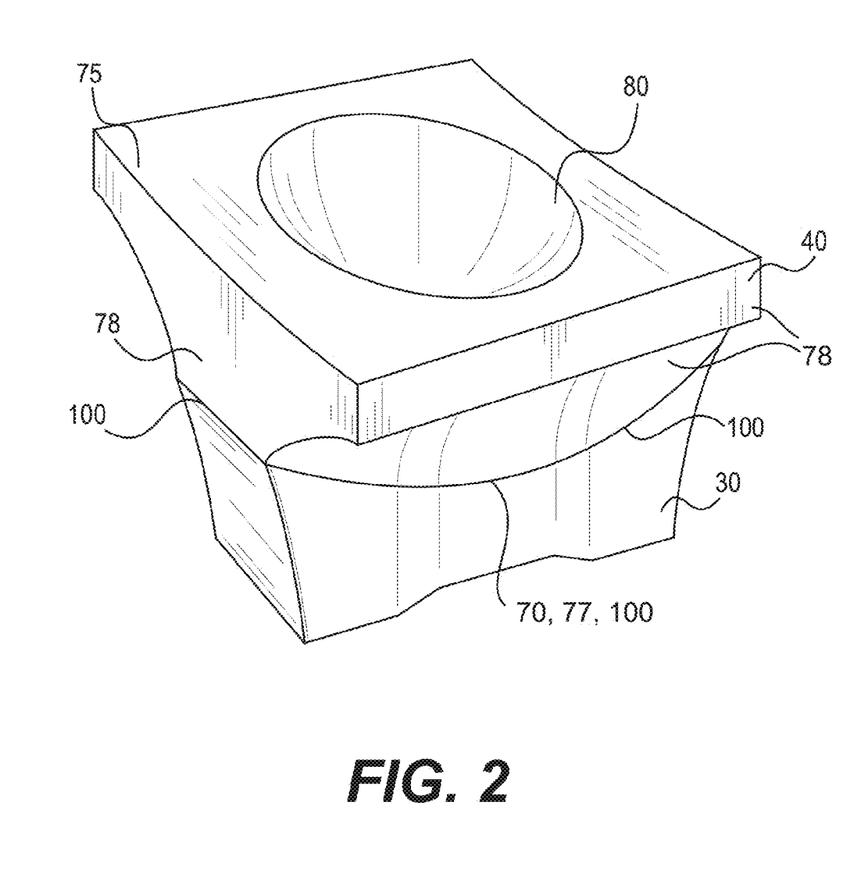
FIG. 2 is a pictorial illustration of an exemplary wear component for use with the wheel of FIG. 1.

Referring to FIG. 2, base portion 40 may include a mounting end 75 for attaching wear component 20 to wheel 10, a distal end 77 opposite mounting end 75, and side surfaces 78 extending from mounting end 75 to distal end 77. As shown, mounting end 75 is generally shaped to follow a contour of wheel 10, thereby facilitating the attachment of wear component 20 to wheel 10. Notably, however, mounting end 75 may include a recess 80, which does not follow the contour of wheel 10. Recess 80 may become a hollow cavity when wear component 20 is attached to wheel 10, thereby reducing the weight of wear component 20 relative to a similarly sized (but solid) wear component. Base portion 40 may be formed from a material with a carbon-equivalent (CE) value of less than 0.7, ensuring that it can be welded to steel (e.g., steel wheel 10) using portable welding equipment in the field (as opposed to specialized welding procedures typically required to be performed in a maintenance facility). For example, base portion 40 may be formed from steel (e.g., carbon steel, alloy steel, or stainless steel).

Figure 3:
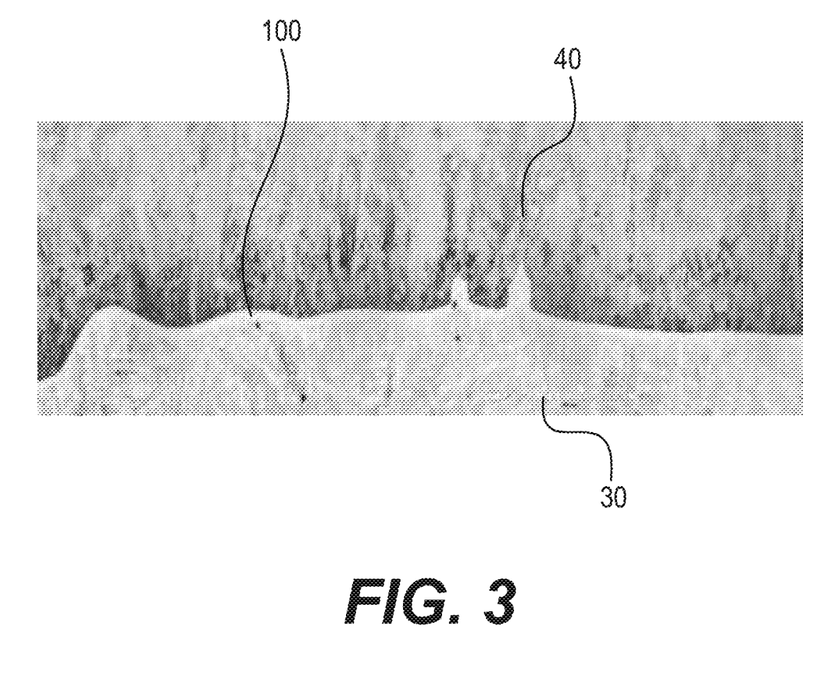
FIG. 3 is a magnified cross-sectional view of an exemplary interface between exemplary tip and base portions of the wear component of FIG. 2.

Base portion 40 may be metallurgically bonded to tip portion 30, that is, portion 40 may be attached to portion 30 primarily by metallurgical bonding. In particular, distal end 77 of base portion 40 may be metallurgically bonded to proximate end 70 of tip portion 30. As shown in FIG. 3, the interface between distal end 77 and proximate end 70 ("base-tip interface 100") may thus be composed solely of a mixture of the material of base portion 40 and the material of tip portion 30. That is, base-tip interface 100 may include no adhesive or filler metal, no oxide films, and no voids.

Figure 4:
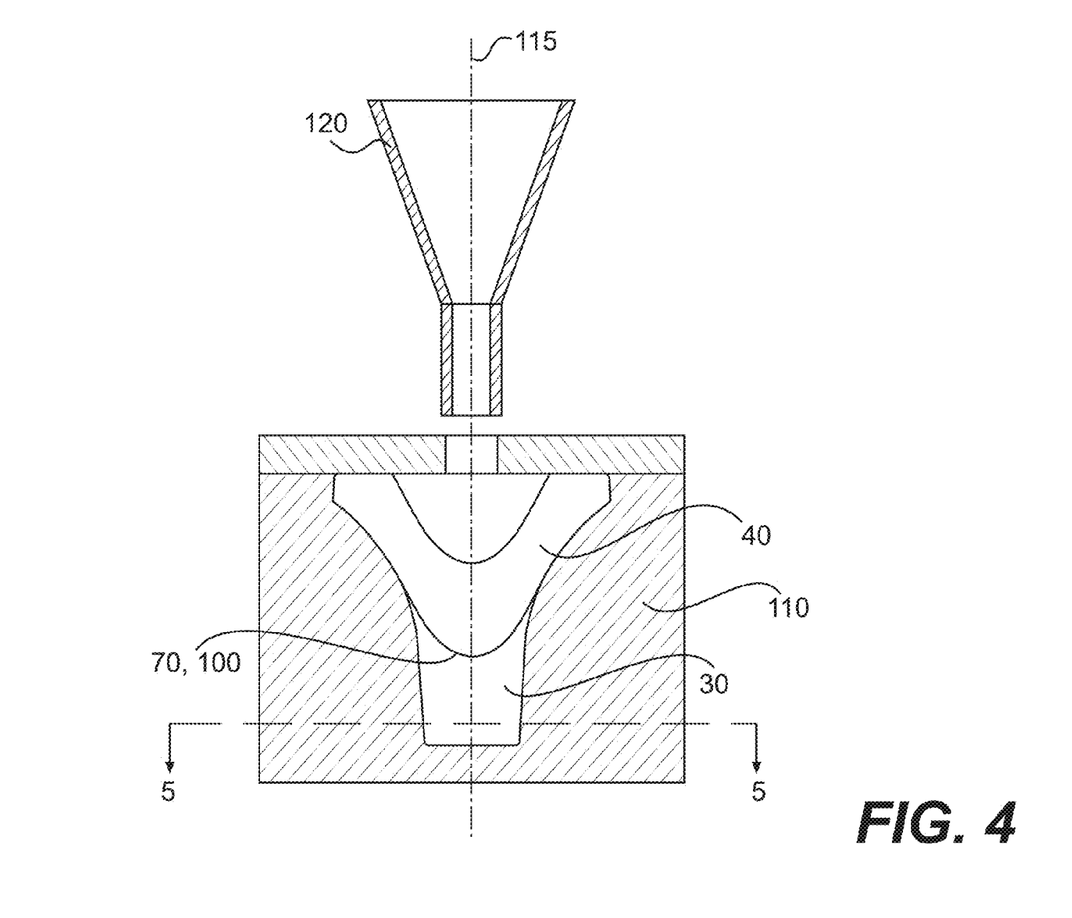
FIG. 4 is a cross-sectional view of an exemplary apparatus for casting the wear component of FIGS. 2 and 3.
Figure 5:
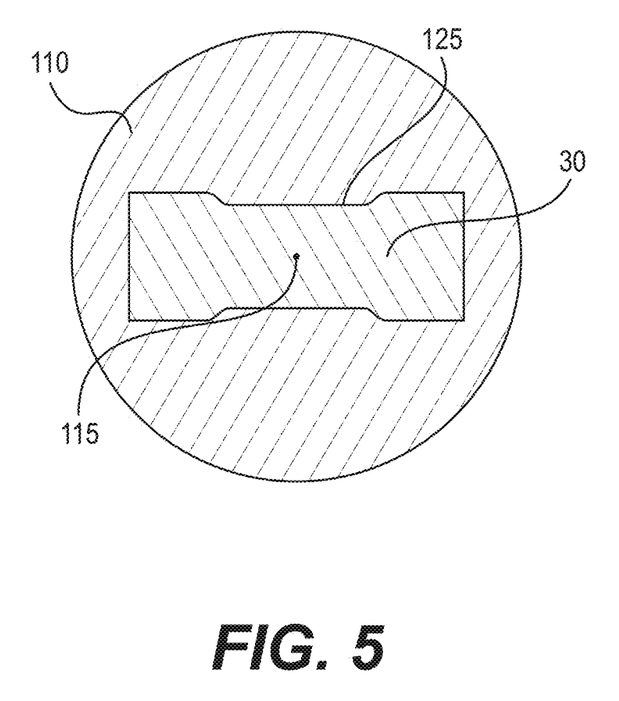
FIG. 5 is a cross-sectional view of the wear component of FIGS. 2-4 in an exemplary mold of the apparatus of FIG. 4.

The shape of base-tip interface 100 (and thus distal end 77 and proximate end 70) may be non-planar, and may be related to the method by which wear component 20 is cast. For example, referring to FIG. 4, wear component 20 may be centrifugally cast using a dual-pour method in which molten first and second materials are poured through a funnel 120 into a rotating mold 110. The molten first material may be poured first to form tip portion 30 while mold 110 is rotated at a first speed. After allowing the first material to cool, the second material may then be poured over the first material (now tip portion 30) to form base portion 40 while mold 110 is rotated at a second speed, which may or may not be the same as the first speed. Both pours may take place while mold 110 is rotated about an axis 115 that is generally parallel to a direction of gravitational acceleration (i.e., a direction in which the materials fall as they are poured). Such rotation may cause the first material to creep up the sides of mold 110, thereby giving proximate end 70 of tip portion 30 (and thus also base-tip interface 100) a generally parabolic cross-sectional profile, as shown in FIG. 4. It should be noted that, below base-tip interface 100, tip portion 30 may have a solid (i.e., free of voids) cross-section that is perpendicular to axis 115, as shown in FIG. 5. Further, it should be understood that the shape of the outer edge 125 of any cross-section of tip portion 30 that is perpendicular to axis 115 will be defined by the shape of mold 110. Thus, outer edge 125 may be non-circular, as shown in FIG. 5. For example, outer edge 125 may be generally I-shaped (as illustrated), generally +(plus)-shaped, or otherwise shaped.

Figure 6:
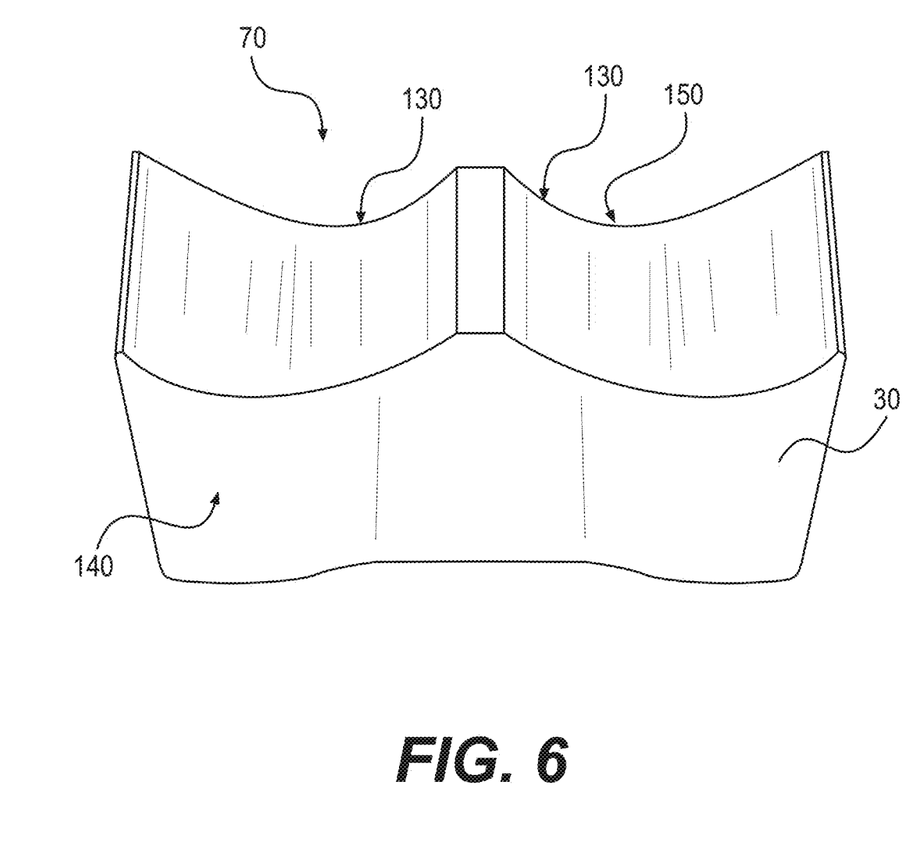
FIG. 6 is a pictorial illustration of another exemplary tip portion.
Figure 7:
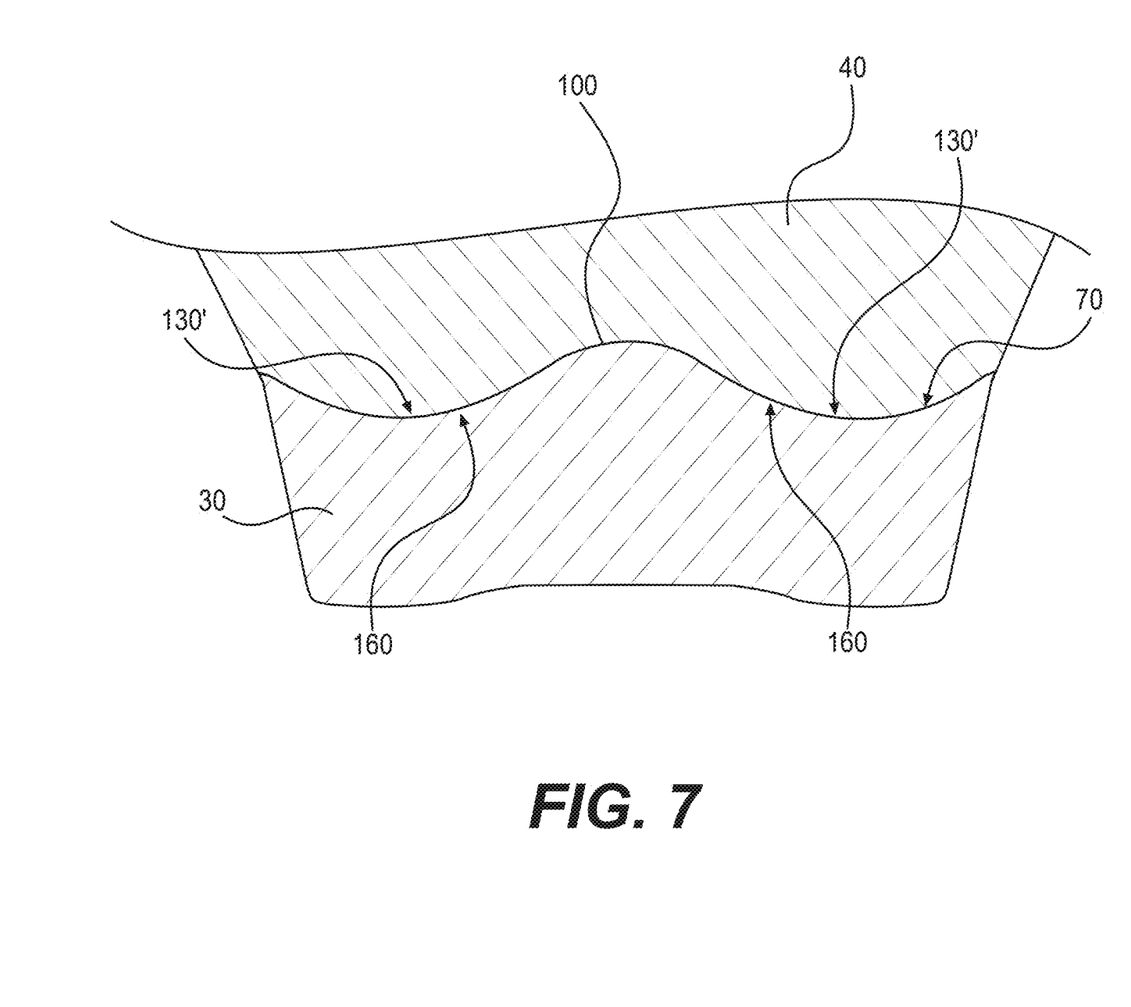
FIG. 7 is a cross-sectional view of the tip portion of FIG. 6 bonded to another exemplary base portion.

In another method of centrifugally casting wear component 20, tip portion 30 may be cast, forged, or machined from a first material before being positioned within mold 110. A molten second material may then be poured into mold 110 over tip portion 30 to form base portion 40, while mold 110 is rotated about axis 115. With this second method, proximate end 70 of tip portion 30 may begin with almost any shape. Proximate end 70's shape may change slightly during molding as a result of the metallurgical bonding process, but it should be understood that the shape of base-tip interface 100 may at least generally track the beginning shape of proximate end 70. For example, as shown in FIG. 6, proximate end 70 may begin with a plurality of recesses 130 extending from a first side 140 of tip portion 30 to a second side 150 of tip portion 30. Each recess 130 may be generally valley-shaped. For example, each recess 130 may be generally U-shaped, and may be wider than it is deep (as illustrated in FIG. 6). In certain embodiments, proximate end 70 may begin with two recesses 130. Referring to FIG. 7, when the molten second material is poured into mold 110 over such recesses 130, the second material may slightly deform recesses 130 into recesses 130'. The second material may then solidify to form base portion 40 with a plurality of protrusions 160, each extending into a corresponding one of recesses 130' at base-tip interface 100. It should be noted that, in some embodiments, protrusions 160 and recesses 130' may mechanically enhance the bond of base portion 40 to tip portion 30.

Figure 8:
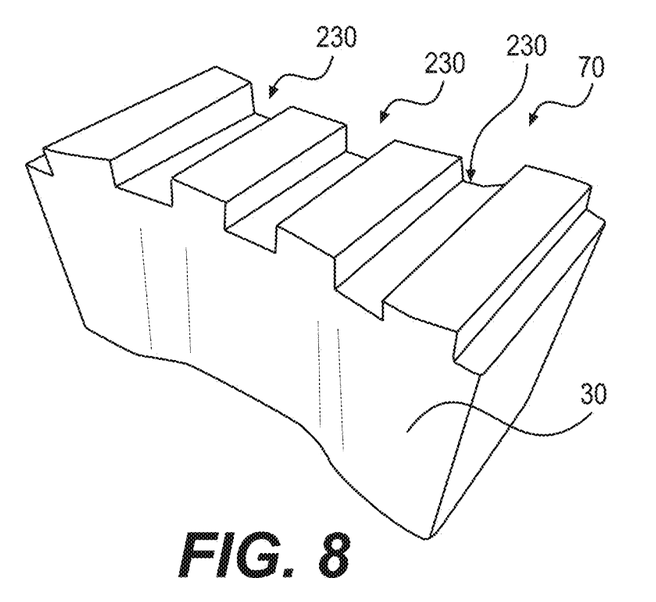
FIGS. 8-13 are pictorial illustrations of yet further exemplary tip portions.
Figure 9:
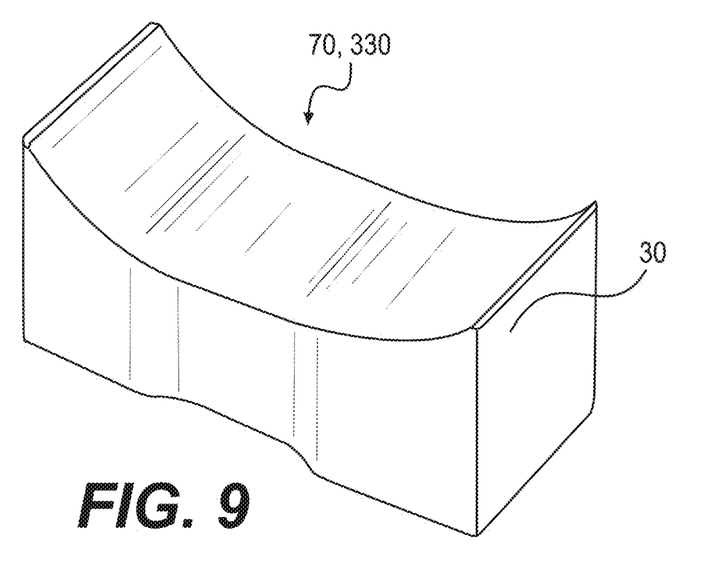

The number, shape, and placement of any protrusions 160 extending into proximate end 70 of tip portion 30 at base-tip interface 100 may be affected by the beginning shape of proximate end 70. For example, rather than beginning with recesses 130 that are wider than they are deep (as illustrated in FIG. 6), proximate end 70 may begin with recesses 130 that are deeper than they are wide. As another example, rather than beginning with recesses 130 that are generally U-shaped (as illustrated in FIG. 6), proximate end 70 may begin with recesses 130 that are generally V-shaped. Alternatively, as illustrated in FIG. 8, proximate end 70 may begin with recesses 230 that are generally box-shaped. In yet another alternative embodiment, rather than beginning with a plurality of recesses 130 or 230 (as illustrated in FIGS. 6 and 8), proximate end 70 may begin with a single recess 330, as shown in FIG. 9.

Figure 10:
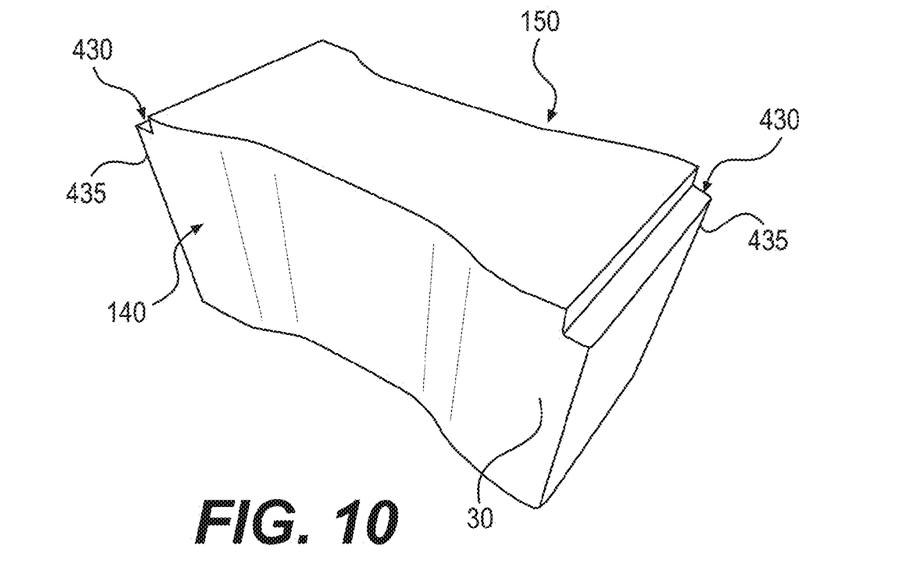
Figure 11:
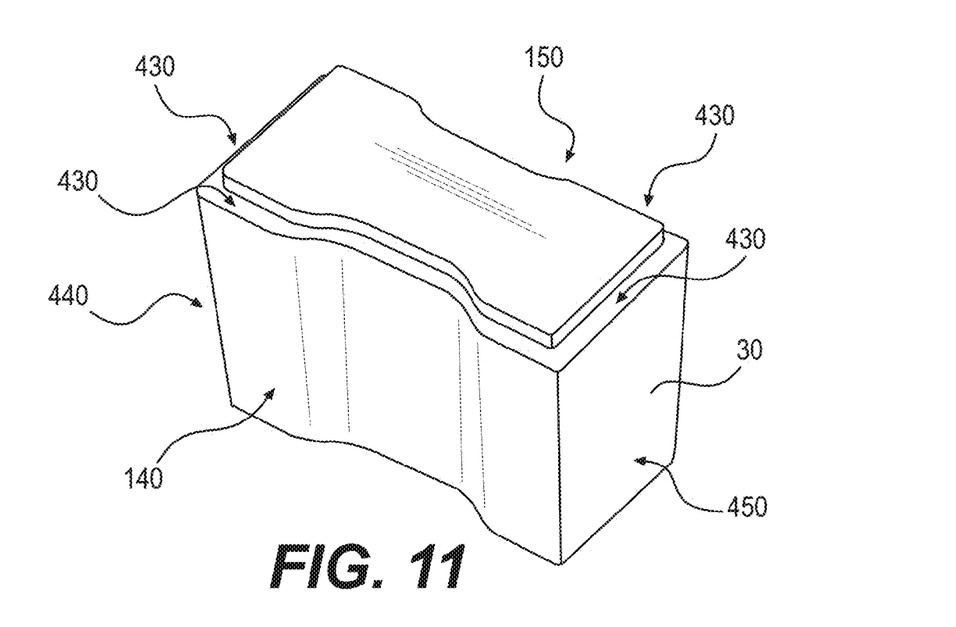

Alternatively, as illustrated in FIG. 10, proximate end 70 may begin with a plurality of recesses 430 in the form of rabbets (i.e., step-shaped recesses) in outer edges 435 of tip portion 30. While FIG. 10 illustrates recesses 430 as extending only from first side 140 to second side 150, recesses 430 may also extend from a third side 440 of tip portion 30 to a fourth side 450 of tip portion 30, as shown in FIG. 11.

Figure 12:
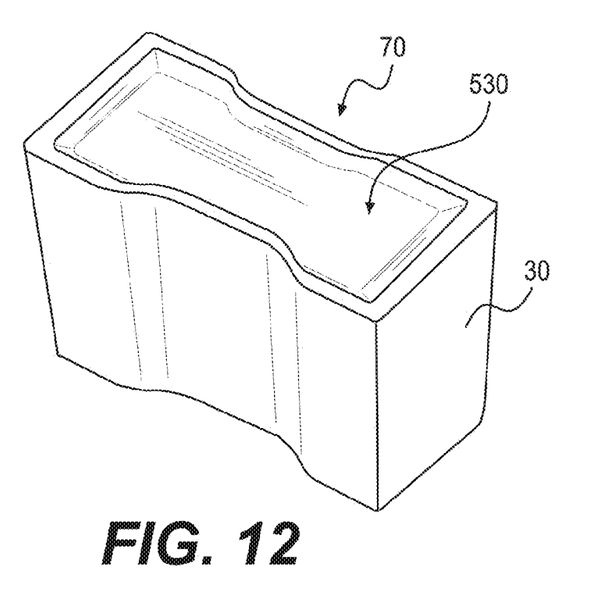
Figure 13:
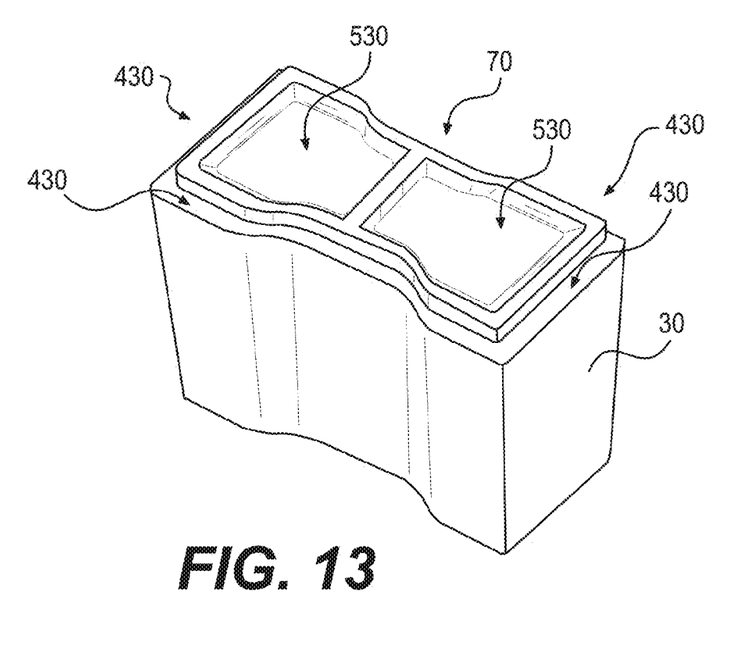

In yet another alternative embodiment, as shown in FIGS. 12 and 13, proximate end 70 may begin with one or more recesses 530 in the form of bathtub-shaped depressions. While such recesses 530 could be the only recesses in proximate end 70, proximate end 70 could also include one or more of the recesses discussed above. For example, as shown in FIG. 13, proximate end 70 may include two recesses 530 and four recesses 430. In fact, it should be understood that proximate end 70 may include any combination of any number of recesses 130, 230, 330, 430, 530, and/or any other similarly shaped recesses.

Figure 14:
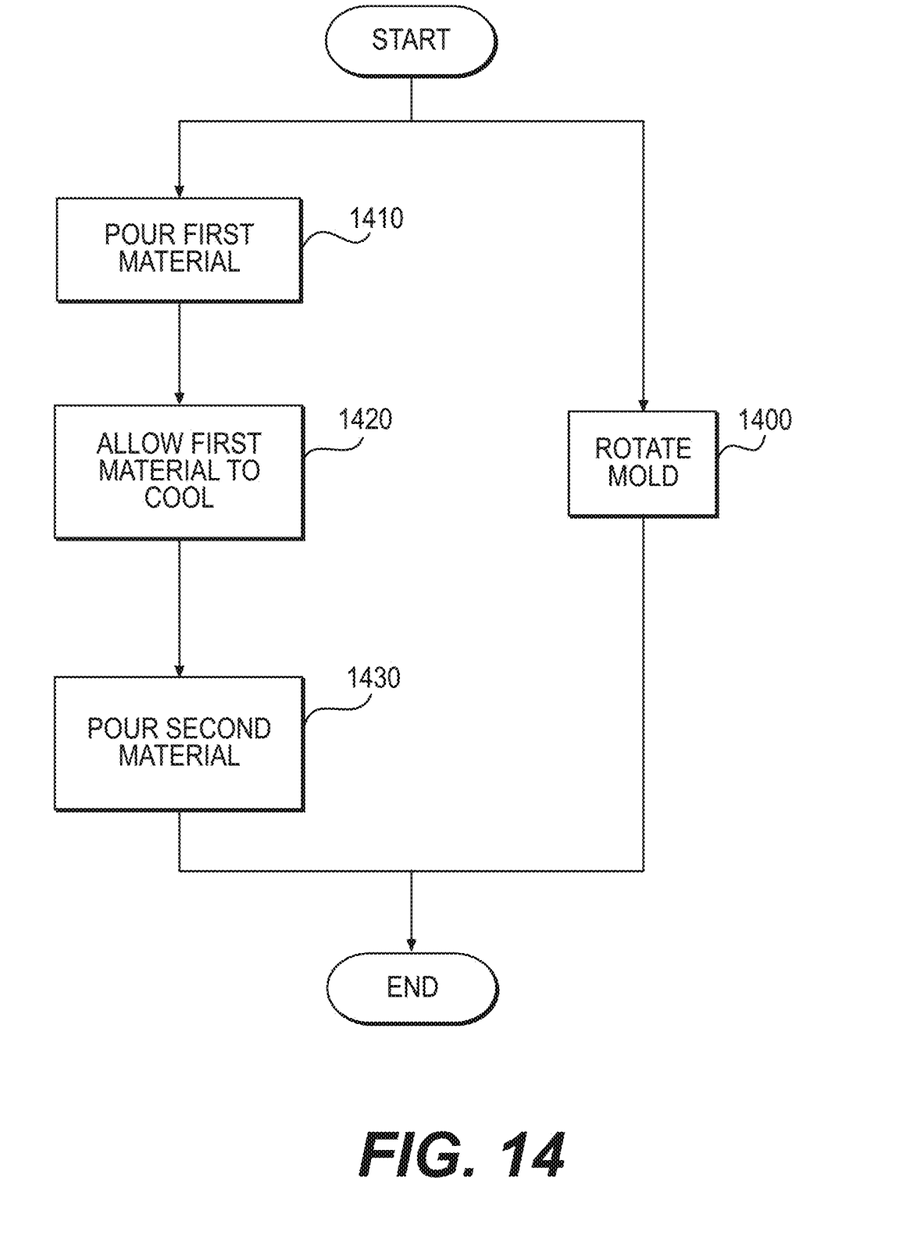
FIGS. 14 and 15 are flow charts describing exemplary disclosed methods of casting articles of manufacture, such as the wear components of the other figures.
Figure 15:
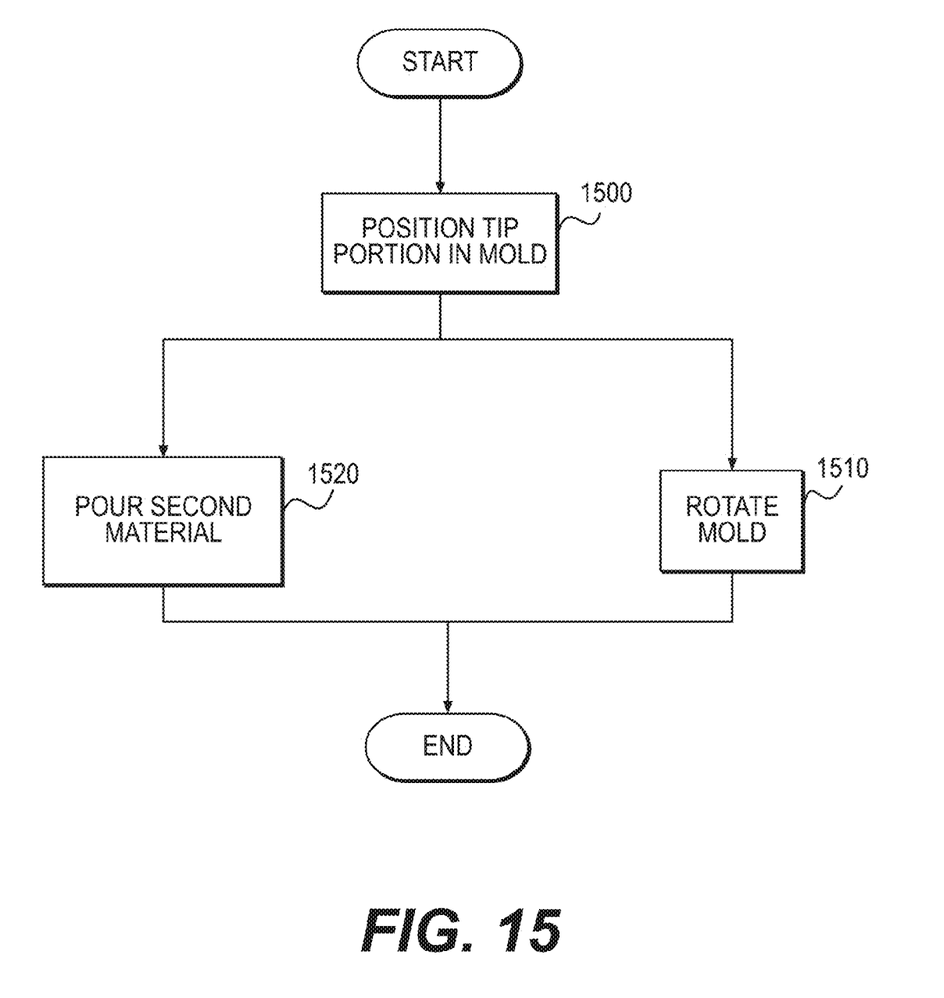

FIGS. 14 and 15 are flow diagrams describing exemplary methods of casting articles of manufacture such as wear components 20, and they will be discussed in the following section.

INDUSTRIAL APPLICABILITY

The disclosed wear components may be fitted to steel components and may be particularly beneficial when fitted to steel wheels of landfill or soil compactors. The wear components may be cast such that they facilitate in-field (as opposed to in-maintenance facility) maintenance of the compactors and also minimize the amount of maintenance the compactors require. Exemplary methods of casting articles of manufacture, such as the disclosed wear components, will now be described.

Referring to FIG. 14, wear component 20 may be centrifugally cast using a dual-pour method in which molten first and second materials are poured into mold 110 while mold 110 is rotated about axis 115 (referring to FIG. 4) (step 1400). First, a molten first material may be poured through funnel 120 into mold 110 to form tip portion 30 while mold 110 is rotated at a first speed (step 1410). The first material may have a hardness of at least 45 Rockwell C, making tip portion 30 highly resistant to abrasion resulting from compaction of material and thereby reducing the number of times wear component must be replaced. For example, as discussed above, the first material may be white iron (e.g., high-chromium white iron or Ni-Hard), carbidic iron, austempered iron, high-carbon steel, high-carbon alloy steel, tool steel, carbidic steel, or stainless steel. While funnel 120 may be positioned such that the first material is poured at a fixed location relative to axis 115 (e.g., along axis 115), funnel 120 may alternatively be moved during the pouring such that the first material is poured at a plurality of different locations relative to axis 115. In any case, the rotation of mold 110 may cause the first material to creep up the sides of mold 110, thereby giving proximate end 70 of tip portion 30 (and thus also base-tip interface 100) a generally parabolic cross-sectional profile, as shown in FIG. 4. Such a profile may enable the first material to protect a large portion of the exterior surface of wear component 20 without occupying a correspondingly large portion of the volume of wear component 20, thereby minimizing the amount of the first material (which may be more costly than the second material) required to form wear component 20.

Next, the first material may be allowed to cool (step 1420). A molten second material may then be poured through funnel 120, into mold 110, over the first material (now tip portion 30) to form base portion 40 while mold 110 is rotated at a second speed, which may or may not be the same as the first speed (step 1430). The second material may have a carbon-equivalent (CE) value of less than 0.7, ensuring that base portion 40 can be welded to steel (e.g., steel wheel 10) using portable welding equipment in the field (as opposed to specialized welding procedures typically required to be performed in a maintenance facility). For example, as discussed above, the second material may be carbon steel, alloy steel, or stainless steel. While funnel 120 may be positioned such that the second material is poured at a fixed location relative to axis 115 (e.g., along axis 115), funnel 120 may alternatively be moved such that the second material is poured at a plurality of different locations relative to axis 115. Notably, the rotation of mold 110 may cause the second material to move radially outward along a surface of the first material when the second material impacts the first material, displacing any foreign materials (e.g., oxide films) on the surface of the first material. The second material may then metallurgically bond base portion 40 to tip portion 30. The rotation of mold 110 may also cause the second material to creep up the sides of mold 110, facilitating the formation of recess 80 in mounting end 75 of base portion 40. This recess 80 may, in turn, become a hollow cavity when wear component 20 is attached to wheel 10, thereby reducing the weight of wear component 20 relative to a similarly sized (but solid) wear component. Such weight reduction may minimize stresses on drivetrain components of compactors using wear components 20, thereby extending the life of the drivetrain components and reducing maintenance costs associated with the drivetrain components. Additionally, the weight reduction may minimize the amount of fuel required to operate the compactors, thereby reducing operating costs associated with the compactors.

In alternative embodiments and referring to FIG. 15, wear component 20 may be centrifugally cast using a tip portion 30 that is cast, forged, or machined from the first material before being positioned within mold 110 (step 1500). In particular, tip portion 30 may be positioned with its proximate end 70 facing upward such that any material poured over tip portion 30 is poured over proximate end 70. Then, while rotating mold 110 about axis 115 (step 1510), the molten second material may be poured into mold 110 over tip portion 30 to form base portion 40 (step 1520). Although funnel 120 may be positioned such that the second material is poured at a fixed location relative to axis 115 (e.g., along axis 115), funnel 120 may alternatively be moved such that the second material is poured at a plurality of different locations relative to axis 115. Notably, the rotation of mold 110 may cause the second material to move radially outward along proximate end 70 when the second material impacts the first material, displacing any foreign materials (e.g., oxide films) on proximate end 70. In some embodiments, the movement may be at least partially guided by recesses 130, 230, 330, 430, and/or 530 of proximate end 70, potentially speeding up and/or slowing down the movement, and thereby maximizing the displacement of foreign materials. The second material may then metallurgically bond base portion 40 to tip portion 30. The rotation of mold 110 may also cause the second material to creep up the sides of mold 110, facilitating the formation of recess 80 in the same way as discussed above with respect to the dual-pour method.

It will be apparent to those skilled in the art that various modifications and variations can be made in the disclosed methods without departing from the scope of the disclosure. Other embodiments of the disclosed methods will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. A method of casting an article comprising, while rotating a mold about an axis:
   pouring a molten first material into the mold to form a first portion of the article having a solid cross-section that is perpendicular to the axis, the solid cross-section having a non-circular, generally I-shaped outer edge;
   allowing the first material to cool; and
   pouring a molten second material into the mold over the first portion to form a second portion of the article that is metallurgically bonded to the first portion of the article.

2. The method of claim 1, wherein:
the first material has a hardness of at least 45 Rockwell C; and
the second material has a carbon-equivalent (CE) value of less than 0.7.

3. The method of claim 2, wherein:
the first material is steel or iron; and
the second material is steel.

4. The method of claim 1, wherein the axis is generally parallel to a direction of gravitational acceleration.

5. The method of claim 1, wherein the pourings occur at a plurality of different locations relative to the axis.

6. A method of casting an article comprising, while rotating a mold about an axis:
pouring a molten first material into the mold to form a first portion of the article having a cross-section that is perpendicular to the axis with a non-circular, generally I-shaped outer edge;
allowing the first material to cool; and
pouring a molten second material into the mold over the first portion to form a second portion of the article that is metallurgically bonded to the first portion of the article.

7. The method of claim 6, wherein:
the first material has a hardness of at least 45 Rockwell C; and
the second material has a carbon-equivalent (CE) value of less than 0.7.

8. The method of claim 7, wherein:
the first material is steel or iron; and
the second material is steel.

9. The method of claim 6, wherein the axis is generally parallel to a direction of gravitational acceleration.

10. The method of claim 6, wherein the pourings occur at a plurality of different locations relative to the axis.

* * * * *